Jan. 1, 1963   J. R. NEVILLE   3,071,530
OXYGEN SENSOR
Filed March 20, 1959
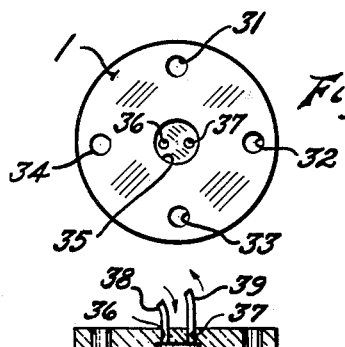
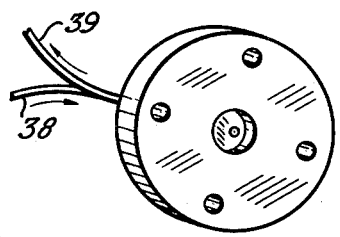
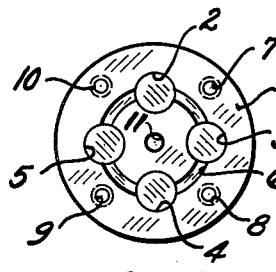
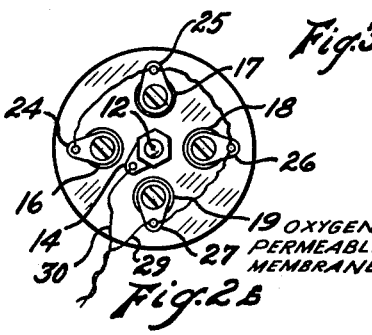
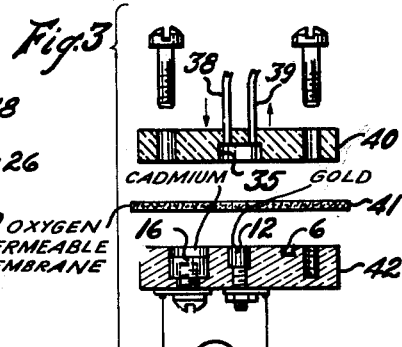
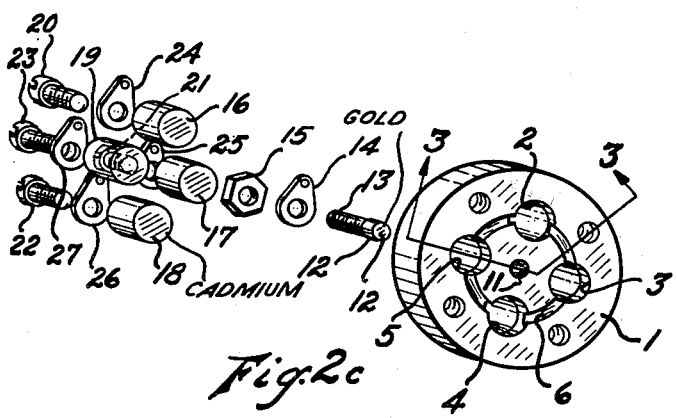
INVENTOR.
JAMES R. NEVILLE
BY
ATTORNEYS

United States Patent Office 3,071,530
Patented Jan. 1, 1963

3,071,530
OXYGEN SENSOR
James Ryan Neville, 10 Chinaberry Court, Apt. 32,
San Antonio, Tex.
Filed Mar. 20, 1959, Ser. No. 800,900
2 Claims. (Cl. 204—195)
(Granted under Title 35, U.S. Code (1952), sec. 266)

The invention described herein may be manufactured and used by or for the United States Government for governmental purposes without payment to me of any royalty thereon.

The present invention relates to apparatus for the quantative and qualitative determination of oxygen in either gases or fluids.

Under extreme physical conditions, such as in space flight, there exists a need for a device capable of performing quantitative or qualitative determination of oxygen concentration, partial pressure, or tension in either gases or fluids. There must be a monitoring of oxygen in sealed chambers, cabins, satellites and other vehicles and enclosures. A further need exists as a hypoxic warning device for aviators, miners, and divers.

In the instances of extreme physical conditions, as encountered in space flight, wherein oxygen measurements are necessary, the present invention provides a novel device which allows a very large order of miniaturization both in weight and volume and allows operation without an external power source of any kind. An important feature of the device resides in its ability to withstand severe shock, shaking, vibration, and jar without affecting its oxygen measuring performance. In addition thereto, the device is insensitive to position displacement or spatial orientation. The present invention requires only a minuscule sample in order to make a measurement but it also can operate rapidly and continuously over extended periods where long term monitoring of oxygen is required. It can be utilized without accessory pumping and/or adsorption systems, and is so simplified in design that it can be produced quickly and inexpensively.

The present invention in addition to providing a novel device for operation under extreme physical condition, can be utilized in hospitals for monitoring anesthetic gases and blood oxygen tensions. It may be used for routine laboratory measurements in the determination of oxygen in gases or fluids and to monitor oxygen in certain chemical and physical processes carried out in manufacturing and processing industries.

The novel device of the present invention operates by virtue of the electrochemical reduction of oxygen on a single gold electrode. The chemical transformation involves an electron transfer from cadmium reference electrodes to a gold electrode through an external electrical circuit. The electron transfer or current flow is related to the amount of oxygen being chemically transformed at the gold electrode and thus absorbed into the system. This latter, in turn, is related to the concentration of oxygen in the gas or fluid being tested by the aforesaid device.

The current is measured with the aid of any suitable technique. It is not necessary to apply a polarizing voltage, since the electrode materials are such that they cause the electrochemical reduction of oxygen to proceed spontaneously when the external circuit is closed.

It is an object of the present invention to provide a novel device for the determination of oxygen in either gases or fluids.

It is another object of the present invention to provide a highly miniaturized device for the determination of oxygen in either gases or fluids.

It is still another object of the present invention to provide a novel device for determining the amount of oxygen in gases or liquids, aforesaid device withstanding severe shock, shaking, vibration, or jar without effect on its determination performance.

Yet another object of the present invention is to provide a novel device for determining oxygen in gases or liquids that is operative without an external power source of any kind.

A further object of the present invention is to provide a novel device for determining the oxygen in gases or fluids wherein the device is insensitive to position displacement or spatial orientation.

A still further object of the present invention is to provide a device for determining oxygen in gases or liquids that require only a minuscule sample in order to make a measurement but can also operate rapidly and continuously over extended periods where long term monitoring of oxygen is required.

The invention is shown herein as embodied in an assembly of parts including two complementary capsules with which is associated an intervening membrane facilitating and controlling the electrolytic action of the fluid imprisoned within said capsules.

A better understanding of my invention and the objects thereof may be had from the particular description made with reference to the accompanying drawings in which:

FIGURES 1a, 1b, and 1c are the plan, perspective and sectional view, respectively, of one of the complementary capsules.

FIGURES 2a and 2b are the top and bottom plan view, respectively, of the other complementary capsule;

FIGURE 2c is an exploded view in perspective of components entering into the complete assembly of the other complementary capsule; and FIGURE 3 is an exploded assembly view of the illustrated embodiment of the invention, with component parts shown in central vertical section, except that the lower complementary capsule is shown in vertical section along the deviating section line 3—3 of FIGURE 2c.

Referring to the drawings, in detail, one of the complementary capsules is shown in top plan view 2a and is constructed of electrical insulating material 1. Holes 2, 3, 4 and 5 are drilled completely through electrical insulating material 1. Circular trough 6 is cut into insulating material 1 and thereby connects holes 2, 3, 4 and 5, respectively, thus forming a reservoir. Holes 7, 8, 9 and 10 are drilled part way through insulating material 10 and then are tapped. Hole 11 is drilled all the way through insulating material 1 from top to bottom thereof.

Now referring to FIGURE 2c, gold electrode 12 is soldered to the top of machine screw 13 and is then inserted through tight fitting hole 11. The top surface of gold electrode 12 is made flush with the top surface of insulating material 1 upon insertion therein. Gold electrode 12 is pressure fitted into hole 11 so that aforesaid hole is effectively sealed as to the escape of fluid. Machine screw 13 extends beyond the top surface of insulating material 1 after insertion into hole 11 and lug 14 is placed thereon. Nut 15 is then applied to screw 13.

Cadmium reference electrodes 16, 17, 18 and 19 are identical and are larger than gold electrode 12. They are pressure inserted into tight fitting holes 2, 3, 4, and 5 so so that the fluid cannot escape. The cadmium reference electrodes are concentric to the gold electrode. Cadmium electrodes 16, 17, 18 and 19 are set back from the bottom surface of insulating material 1 after insertion into their respective holes and thus form four wells. The four wells thus formed are joined by circular trough 6 which is cut into insulating material 1. The four wells and connecting trough form a common reservoir for electrolyte fluid.

Cadmium electrodes 16, 17, 18 and 19 are so arranged that machine screws 20, 21, 22 and 23 with their associated lugs 24, 25, 26 and 27 respectively, can be firmly applied thereto.

FIGURE 2b is the bottom plan view of one of the complementary capsules and shows lugs 24, 25, 26, and 27 electrically connected to cadmium electrodes 16, 17, 18, and 19, respectively. The aforementioned lugs are interconnected by common conductor 29. Lug 14 is connected electrically to gold electrode 12. Conductor 30 is connected to lug 14.

One of the other aforesaid complementary capsules is shown in various views of FIGURES 1a, 1b, and 1c, and will hereinafter be referred to as the sampling collar. The sampling collar is constructed of the identical insulating material 1 as utilized for the complementary capsules of FIGURE 2a. FIGURE 1a shows a bottom plan view of the sampling collar and has four holes 31, 32, 33 and 34 drilled completely therethrough for attaching the collar to its complementary capsule. Another hole 35 is drilled approximately half way through the collar. When the sampling collar and the complementary capsule of FIGURE 2c are assembled, the open end of hole 35 fits directly above gold electrode 12. Two holes 36 and 37 are drilled in hole 35 of the sampling collar through to the other side. This aspect is most clearly shown in the sectional view of FIGURE 1c where hole 35 is shown having two aforesaid holes 36 and 37. Holes 36 and 37 have inserted therein two hollow extension tubes 38 and 39 respectively. The extension tubes fit tightly so that gas or fluid cannot escape by way of holes 36 and 37. A perspective view of the sampling collar is shown in FIGURE 1b.

Referring now to FIGURE 3, the component parts of the assembly are complementary capsules 40 and 42. The other important component is interposed oxygen permeable membrane 41. Complementary capsule 40 is identical to the one shown in section view of FIGURE 1c. Complementary capsule 42 is the vertical section along deviating section line 3—3 of FIGURE 2c. There are four wells in capsule 42 formed by setting the cadmium electrodes back from the top surface of aforesaid capsule, as shown for one well by offsetting cadmium electrode 16. The four wells are interconnected by trough 6, thus forming a reservoir. An aqueous electrolyte is poured into said reservoir. The electrolyte may be alkaline, neutral or acid. An example of alkaline electrolyte is potassium hydroxide. The neutral electrolyte may be one such as salts or potassium chloride. Acid electrolyte may be one such as solutions of sulfuric acid. The concentrations may vary over wide ranges. After the application of the aqueous solution of electrolyte, membrane 41 is stretched tightly across the entire top surface of complementary capsule 42. Complementary capsule 40 is then tightly clamped to capsule 42 with oxygen permeable membrane interposing therebetween, thus sealing in the aforementioned fluids. The clamping is accomplished by means of four screws, two of which are shown above capsule 40. The screws pass through capsule 40 and are tightened into the tapped holes of capsule 42. Membrane 41, which prevents evaporation of the electrolyte fluid both within aforesaid reservoir and between the gold electrode and the membrane, allows rapid diffusion of oxygen to the gold electrode. Ingress of gas or fluid containing traces of oxygen to be measured is obtained by way of extension tube 38 and egress of the gas or fluid to be measured is obtained by way of extension tube 39. The gas or fluid being measured for oxygen content is then present in hole 35. Oxygen diffuses through membrane 41 and into the thin layer of electrolytic fluid. The device operates by virtue of the electrochemical reduction of oxygen on gold electrode 12. The chemical transformation involves an electron transfer from cadmium reference electrodes to the gold electrode through the external circuit of which ammeter 43 is part. The electron transfer or current flow is related to the amount of oxygen being chemically transformed at the gold electrode. This latter, in turn, is related to concentration of oxygen in the gas or fluid contained in the sampling collar, complementary capsule 40. It is not necessary to apply a polarizing voltage, since the electrode materials have been selected with the purpose of causing the electrochemical reduction of oxygen to proceed spontaneously when the external circuit is closed.

It is to be noted that sampling collar, capsule 40, can have two forms, the open and the closed. The closed is shown as capsule 40 and the open form of the sampling collar is identical except that the hole forming the space above the gold electrode is drilled completely through the collar. In this case, the smaller access holes and their associated extension tubes are not required.

What is claimed is:

1. Oxygen sensor apparatus comprising, in combination, a miniaturized assembly comprising a pair of complementary chambered members having registering passages therein for reception of electrolytic fluid and a sample of oxygen to be tested, a pair of electrodes mounted in one of said members, the passages in said member comprising a plurality of relatively deep wells for retention of said fluid and relatively shallow trough means interconnecting said wells facilitating optimum distribution of said fluid throughout said member, oxygen permeable membranous means interposed between said members to retain and controllably direct the introduced oxygen toward said electrodes and means in electrical connection with said electrodes for measuring the extent of electron current flow representative of the oxygen content.

2. In an oxygen sensor device comprising, in combination, a miniaturized assembly comprising a pair of complementary members, the first of said pair of complementary members housing a gold electrode having a top surface thereof flush with the surface of said housing member, cadmium electrodes concentric to said gold electrode and set back from said surface of said housing to form a well for retaining electrolytic fluid for each of said cadmium electrodes, trough means in said surface interconnecting said wells, an oxygen permeable membrane interposed between said complementary members for preventing evaporation of electrolytic fluid, the second of said pair of complementary members being clamped to the first of said complementary members to enclose said electrodes and fluid, passage means in the second of said complementary members to introduce a sample to be measured, and meter means interconnected directly between said electrodes to measure the magnitude of current flow, said current flow being representative of the oxygen content of the material being measured.

References Cited in the file of this patent

UNITED STATES PATENTS

| | | |
|---|---|---|
| 2,114,234 | Ornstein et al. | Apr. 12, 1938 |
| 2,464,087 | Jacobson | Mar. 8, 1949 |
| 2,540,674 | Jacobson | Feb. 6, 1951 |
| 2,681,571 | Becker | June 22, 1954 |
| 2,805,191 | Hersch | Sept. 3, 1957 |
| 2,913,386 | Clark | Nov. 17, 1959 |
| 2,939,827 | Jacobson et al. | June 7, 1960 |
| 2,943,028 | Thayer et al. | June 28, 1960 |
| 2,943,036 | Thayer et al. | June 28, 1960 |